(12) United States Patent
Lokare et al.

(10) Patent No.: US 11,534,719 B1
(45) Date of Patent: Dec. 27, 2022

(54) MEMBRANES WITH CONTROLLED POROSITY FOR SERIAL FILTRATION

(71) Applicant: Gradiant Corporation, Woburn, MA (US)

(72) Inventors: Omkar Lokare, Somerville, MA (US); Richard Stover, Waltham, MA (US)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 17/305,289

(22) Filed: Jul. 2, 2021

(51) Int. Cl.
| | | |
|---|---|---|
| *B01D 61/08* | (2006.01) | |
| *B01D 61/02* | (2006.01) | |
| *B01D 71/56* | (2006.01) | |
| *C02F 1/44* | (2006.01) | |
| *B01D 67/00* | (2006.01) | |

(52) U.S. Cl.
CPC ............ *B01D 61/08* (2013.01); *B01D 61/025* (2013.01); *B01D 67/0006* (2013.01); *B01D 71/56* (2013.01); *C02F 1/441* (2013.01); *B01D 2311/08* (2013.01); *B01D 2313/243* (2013.01); *B01D 2317/022* (2013.01)

(58) Field of Classification Search
CPC .. B01D 61/022; B01D 61/58; B01D 67/0093; B01D 71/56; B01D 69/125; B01D 2317/022; C02F 1/441; C02F 9/00
See application file for complete search history.

(56) References Cited

U.S. PATENT DOCUMENTS

| | | | |
|---|---|---|---|
| 3,886,066 A | | 5/1975 | Chen et al. |
| 4,277,344 A | * | 7/1981 | Cadotte ............... B01D 69/125 |
| | | | 428/479.3 |
| 4,765,897 A | * | 8/1988 | Cadotte ............. B01D 67/0088 |
| | | | 210/500.23 |

(Continued)

FOREIGN PATENT DOCUMENTS

CN 107441934 B 1/2020

OTHER PUBLICATIONS

Publication No. CN111437729 A; Method for repairing and modifying waste reverse osmosis membrane, Li Hong et al Apr. 23, 2020 (Year: 2020).*

(Continued)

*Primary Examiner* — Jonathan M Peo
(74) *Attorney, Agent, or Firm* — Modern Times Legal; Robert J. Sayre (57) ABSTRACT

A serial filtration system for liquid purification includes a preliminary-stage reverse-osmosis (RO) module and a first-stage, high-permeability, reverse-osmosis (HiRO) module. Both modules include (a) a chamber including an inlet, a retentate outlet, and a permeate outlet, and (b) at least one membrane separating the chamber into a retentate side on an upstream side of the membrane and a permeate side on a downstream side of the membrane. The membrane in the preliminary stage is an RO membrane, while the membrane in the first stage is an oxidized membrane. The first-stage inlet is in fluid communication with the preliminary-stage, (Continued)

retentate outlet; and the oxidized membrane in the first stage, comprises an oxidized polyamide active layer coated on a porous support, wherein the oxidized polyamide active layer has an atomic oxygen/nitrogen ratio of at least 1.5.

17 Claims, 3 Drawing Sheets

(56) References Cited

U.S. PATENT DOCUMENTS

| | | | | |
|---|---|---|---|---|
| 4,814,082 | A * | 3/1989 | Wrasidlo | B01D 67/0093 210/500.37 |
| 4,828,700 | A | 5/1989 | Fibiger et al. | |
| 4,885,091 | A * | 12/1989 | Swedo | B01D 69/125 210/500.37 |
| 4,964,998 | A * | 10/1990 | Cadotte | B01D 61/025 210/654 |
| 5,876,602 | A * | 3/1999 | Jons | B01D 69/125 210/500.38 |
| 6,171,497 | B1 * | 1/2001 | Hirose | B01D 67/0093 210/321.6 |
| 9,206,060 | B1 * | 12/2015 | Abusharkh | B01D 65/08 |
| 2005/0211632 | A1 * | 9/2005 | Hung | B01D 61/08 210/652 |
| 2009/0120873 | A1 * | 5/2009 | Becker | B01D 65/02 210/636 |
| 2012/0238777 | A1 * | 9/2012 | Harasek | C13B 20/165 562/554 |
| 2014/0021135 | A1 | 1/2014 | Sawyer et al. | |
| 2015/0014248 | A1 | 1/2015 | Herron et al. | |
| 2015/0343386 | A1 * | 12/2015 | Labib | B01D 65/06 210/636 |
| 2016/0136577 | A1 * | 5/2016 | McGovern | B01D 61/022 210/652 |
| 2017/0252705 | A1 * | 9/2017 | Song | B01D 69/02 |
| 2018/0104649 | A1 | 4/2018 | Govindan et al. | |
| 2019/0275469 | A1 * | 9/2019 | Bruno | C07D 487/10 |
| 2019/0321788 | A1 | 10/2019 | Endo et al. | |
| 2020/0086274 | A1 | 3/2020 | Benton et al. | |
| 2020/0188861 | A1 * | 6/2020 | Hamada | B01D 69/125 |
| 2021/0046432 | A1 * | 2/2021 | Kawakatsu | B01D 69/12 |

OTHER PUBLICATIONS

Mitrouli et al., "Reverse Osmosis Membrane Treatment Improves Salt-Rejection Performance", IDA Journal, pp. 22-33, published 2010, 12 total pages. (Year: 2010).*
Mauricio Kipper da Silva, et al., "Rejuvenating polyamide reverse osmosis membranes by tannic acid treatment," 100 Separation and Purification Technology 1-8 (Aug. 31, 2012).
Raquel Garcia-Pacheco, et al., "Transformation of end-of-life RO membranes into NF and UF membranes: Evaluation of membrane performance," 495 Journal of Membrane Science 305-315 (Aug. 14, 2015).
Serena Molina Martinez, et all, "Transformation of End-of-Life RO Membrane into Recycled NF and UF Membranes, Surface Characterization," Conference Paper, the International Desalination Association World Congress on Desalination and Water Reuse 2015, San Diego, CA (Sep. 2015).
Raquel Garcia-Pacheco, et al., "Validation of recycled membranes for treating brackish water at pilot scale," 433 Desalination (Jan. 2018).
Jianwen Zhai, et al., "An Innovative RO Design to Concentrate Salts at Lower Pressure than Osmotic Pressure of the Brine," Conference Paper, the International Desalination Association World Congress, Sao Paulo, Brazil (Oct. 2017).
S.T. Mitrouli, et al., "Application of hydrophilic macromolecules on thin film composite polyamide membranes for performance restoration," 278 Desalination 105-116 (2011).
Zhangxin Wang, et al., "Minimal and zero liquid discharge with reverse osmosis using low-salt-rejection membranes," 170 Water Research 115317 (Nov. 20, 2019).

* cited by examiner

MEMBRANES WITH CONTROLLED POROSITY FOR SERIAL FILTRATION

BACKGROUND

The discussion of the background state of the art, below, may reflect hindsight gained from the disclosed invention(s); and these characterizations are not necessarily admitted to be prior art.

Liquids, such as water, with dissolved components and particles can be purified by removing those dissolved components via reverse osmosis, a process that separates ions and particles using a partially permeable membrane and pressure applied to the side of the membrane with a higher concentration of solute to overcome osmotic pressure to drive a liquid, such as water, across the membrane to the side with a lower concentration of dissolved salt ions, while the membrane blocks passage of the salt ions therethrough.

Meanwhile nanofiltration is a process that uses a membrane with nanometer-scale (i.e., pore diameters of 1-10 nm) through-pores that pass through the membrane. Accordingly, nanofiltration membranes have pores that are smaller than those used in microfiltration and ultrafiltration but larger than those found in reverse-osmosis membranes (typically on the order of about 0.1 nm). Nanofiltration is used in filtration applications involving aqueous liquids for the removal of organic compounds, or in some cases for the selective removal of larger ionic compounds, such as sulfates.

SUMMARY

A serial filtration system and methods for its use and fabrication are described herein, where various embodiments of the apparatus and methods may include some or all of the elements, features and steps described below.

A serial filtration system for liquid purification includes a preliminary-stage, reverse-osmosis module, including (a) a preliminary-stage chamber including a preliminary-stage inlet; a preliminary-stage, retentate outlet; and a preliminary-stage permeate outlet; (b) at least one preliminary-stage, reverse-osmosis membrane mounted in the preliminary-stage chamber and separating the preliminary-stage chamber into a retentate side, including the preliminary-stage inlet and the preliminary-stage, retentate outlet, on an upstream side of the preliminary-stage reverse-osmosis membrane and a permeate side, including the preliminary-stage permeate outlet, on a downstream side of the preliminary-stage reverse-osmosis membrane. The serial filtration system also includes a first-stage, high-permeability, reverse-osmosis module, including (a) a first-stage chamber including a first-stage inlet; a first-stage retentate outlet; and a first-stage permeate outlet, wherein the first-stage inlet is in fluid communication with the preliminary-stage, retentate outlet; and (b) at least one first-stage, oxidized membrane, comprising an oxidized polyamide active layer coated on a porous support, wherein the oxidized polyamide active layer has an atomic oxygen/nitrogen (O/N) ratio of at least 1.5, and wherein the first-stage, oxidized membrane is mounted in the first-stage chamber and separates the first-stage chamber into a retentate side, including the first-stage inlet and the first-stage, retentate outlet, on an upstream side of the first-stage, oxidized membrane and a permeate side, including the first-stage permeate outlet, on a downstream side of the first-stage oxidized membrane.

In a method for serial filtration using a serial filtration system, as described above, a feed liquid comprising a solvent and dissolved ions is fed through the preliminary-stage inlet into the preliminary-stage chamber; and a pressure on the retentate side of the preliminary-stage, reverse-osmosis module is established that is greater than a pressure on the permeate side of the preliminary-stage chamber. A solvent in a preliminary-stage permeate is preferentially passed from the retentate side of the preliminary-stage chamber through the preliminary-stage, reverse-osmosis membrane into the permeate side of the preliminary-stage chamber while retaining a preliminary-stage retentate brine with an increased concentration of the dissolved ions on the retentate side of the preliminary-stage chamber. The preliminary-stage retentate brine is removed through the preliminary-stage, retentate outlet and then directed through the first-stage inlet into the first-stage chamber; and a pressure in the retentate side of the first-stage chamber is established that is greater than a pressure in the permeate side of the first-stage chamber. A solvent in a first-stage permeate is preferentially passed from the retentate side of the first-stage chamber through the first-stage, oxidized membrane into the permeate side of the first-stage chamber while a first-stage retentate brine with a further-increased concentration of the dissolved ions is retained on the retentate side of the first-stage chamber.

A method for fabricating an oxidized membrane for high-permeability, reverse osmosis includes providing a reverse-osmosis membrane comprising a polyamide layer coated on a porous support. The polyamide layer is exposed to an oxidant to create a chlorine loading of 1-10% in the polyamide layer. Methods described herein combine a process of oxidizing membranes to create pores in the active layer of a reverse-osmosis membrane and successively desalinating water via multi-stage filtration using the oxidized membranes. Additionally, tuning the oxidation process can result in a membrane with appropriate permeability characteristics. Furthermore, fouled membranes can be oxidized to revive permeability. Also disclosed is a method for treating membranes to reduce permeability for use in multi-stage filtration processes.

The oxidation process described herein facilitates careful control of the resultant membrane's salt and water permeabilities as well as resulting in a membrane with high water permeability. Existent commercial membranes are not suitable for use in desalination via multi-staged high-permeability reverse osmosis (HiRO) because they lack these properties. Existing reverse-osmosis (RO) membranes are insufficiently permeable to both salts and water, requiring a prohibitively high pressures and/or large membrane areas. Existing nanofiltration (NF) membranes allow too great a proportion of salts to pass, resulting in a need for large numbers of successive stages. Because each stage requires re-pressurization of the permeate, such systems are extremely energy intensive. In addition, existing NF membranes concentrate divalent ions while allowing a high proportion of monovalent ions to permeate, resulting in increased risk of divalent salt precipitation. Accordingly, the membranes described herein can offer substantial advantages over previous membranes and can uniquely enable the practice of the multi-stage desalination methods described herein.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described or illustrated as being "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Described below is a desalination process and a membrane used therefor, with an associated method of manufacturing the membrane. Both the hydraulic pressure required to desalinate a saline influent stream and the salinity of the resulting permeate can be controlled by manipulating the permeability of the membrane. As described herein, specially engineered desalination membranes with a manipulated permeability are used to partially desalinate an influent saline stream in successive steps. A greater portion of the influent ions pass through these membranes compared to reverse-osmosis (RO) membranes, reducing the hydraulic pressure required to drive the desalination process. A greater portion of the influent ions are rejected by the membrane compared to nanofiltration (NF) membranes, reducing permeate salinity. Highly saline streams can be efficiently desalinated using this process because the higher permeability reduces the required hydraulic pressure.

Processes for serial filtration with membranes have been proposed in the past. However, a serial membrane-filtration process is believed to have never been commercialized because a suitable membrane was lacking. A suitable membrane for the serial-filtration process is herein advantageously provided with a carefully selected ion permeability while maintaining the membrane's high permeability to water. If the ion permeability is too great, the resulting permeate will be insufficiently desalinated, requiring an economically prohibitive number of membrane stages. If the ion permeability is too low for a given water permeability, the pressure required to desalinate will be impractically high. Furthermore, low ion permeability will reduce ion permeation into the membrane, thus reducing the osmotic-pressure-reducing effect of the bulk osmotic pressure on the permeate side. High water permeability is advantageous to reduce the required membrane area to an economically feasible quantity.

Ion permeability can be calculated from the ion flux through the membrane; and the respective concentrations of ions on either side of the membrane can be calculated using equation 1, below:

$$J_s = B(C_F - C_P) \qquad (1)$$

In the above equation, $J_s$ represents the ion flux; $C_F$ represents the concentration of ions on the feed side of the membrane; $C_P$ represents the concentration of ions on the permeate side of the membrane; and B represents the ion permeability. Ion permeability is highly dependent on the species of ions in the feed stream and on the ion concentrations on either side of the membrane and is thus a property that is a function of the feed stream as well as the membrane Water permeability, A, can be calculated from the water flux, $J_w$, through the membrane; the hydraulic pressure differential, $\Delta P$, across the membrane; and the osmotic differential, $\Delta \pi$, across the membrane, as shown below in equation 2:

$$J_w = A(\Delta P - \Delta \pi) \quad (2)$$

The ratio of ion permeability to water permeability during operation can be particularly important because this ratio determines the salinity of the permeate stream. Thus, the ratio and the magnitude of permeabilities are the parameters on which the suitability of the membrane depends. Commercial nanofiltration membranes have insufficient rejection rates, letting too many ions pass through, while commercial reverse-osmosis membranes have insufficient water permeability. In addition, commercial nanofiltration membranes preferentially reject divalent ions. Divalent ions can form insoluble salts at sufficiently high concentrations. Therefore, the risk of salt precipitation is great with the use of nanofiltration membranes for high-salinity desalination.

Figure 2:
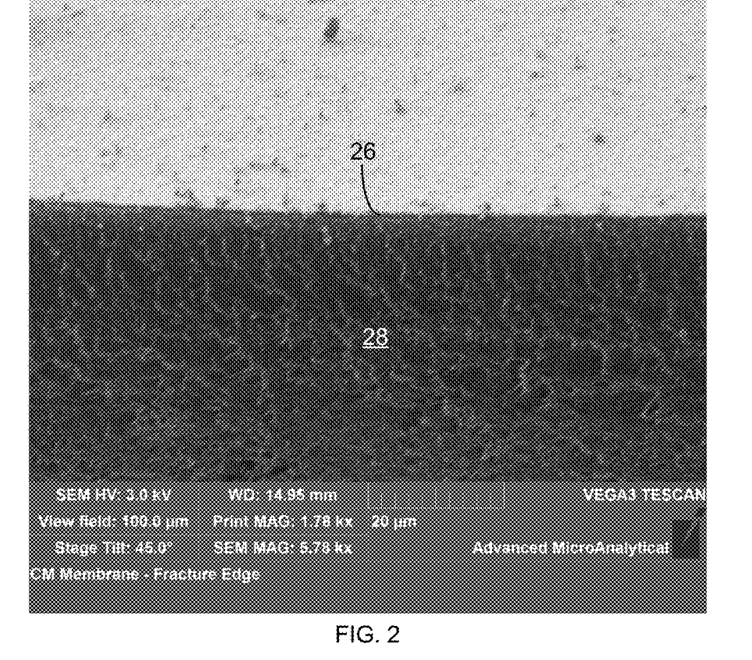
FIGS. 2 and 3 are scanning-electron-microscope (SEM) images of the cross-section of a membrane sample, showing an oxidized polyamide active layer on porous substrate.
Figure 3:
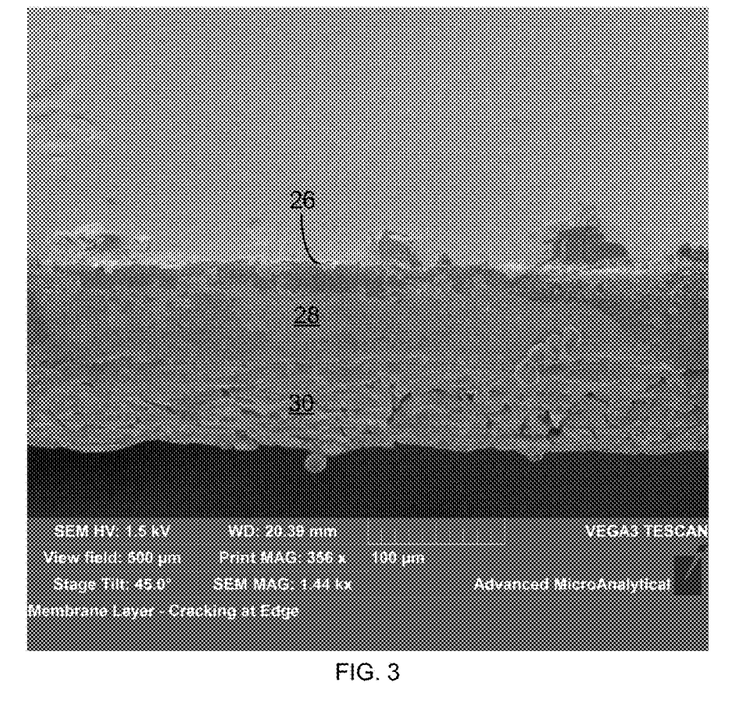

A typical reverse-osmosis membrane includes a thin polyamide active layer (about 100-200-nm thick and formed, e.g., via a polymerization of acid chloride and diamine) deposited on a polyethersulfone or polysulfone porous layer 28 (about 50-μm thick), which can be coated on a nonwoven fabric support sheet 30 (about 150-μm thick and formed, e.g., of polyester). The polyamide active layer serves as the main selective barrier to passage of the dissolved salt through the membrane. The membranes used for this process are manufactured by partially oxidizing the polyamide active layer of such a reverse-osmosis membrane, creating pores in the oxidized active layer 26, as shown in the SEM images of FIGS. 2 and 3.

The active layer of a reverse-osmosis membrane faces the retentate side in an RO chamber, while the porous support on which the active layer is deposited faces the permeate side; and the active layer is typically composed of a fully aromatic polyamide. The aromatic polyamide is formed from an interfacial polymerization process in which an aqueous solution of aromatic amine monomers is brought into contact with aromatic acid chloride monomers dissolved in an organic solvent. The reaction resets in a crosslinked polymer. Oxidation of the resulting active layer can have several effects, one of which is reducing this crosslinking by cleavage of C—N bonds and formation of COOH— groups. This effect of oxidation, which can be measured, can increase the membrane permeability and reduce rejection of solutes. When a polyamide is fully crosslinked, all oxygen and nitrogen in the active layer form amide groups, resulting in a 1:1 atomic oxygen/nitrogen (O/N) ratio, whereas a 2:1 atomic O/N ratio indicates a linear polyamide in which a free carboxyl (COOH—) is present for every two amide groups in the polymer. These atomic ratios in the active layer can be measured by x-ray photoelectron spectroscopy, which is a highly surface-sensitive technique capable of detecting the elemental composition of the 1-5 nm of the active layer closest to the surface. The pores created by this process may have a molecular weight cutoff (MWC) of 100-200 Daltons The active layers of typical virgin reverse-osmosis membranes have a high degree of crosslinking. In some cases, the unoxidized membrane may have a fully crosslinked active layer, having an atomic O/N ratio of 1:1. In some cases, the unoxidized membrane may have a highly crosslinked active layer, having an atomic O/N ratio, e.g., of 1.1:1, of 1.2:1, of 1.3:1, of 1.4:1, or of another ratio in a range from any of the preceding ratios to another of the preceding ratios. As described above, oxidizing the membrane may decrease the degree of crosslinking in the active layer, resulting in an increased atomic O/N ratio. For example, the quantity of atomic oxygen relative to atomic nitrogen may be increased by at least 0.1, by at least 0.15, by at least 0.2, by at least 0.25, by at least 0.3 or by at least 0.35, or in some cases by at least 0.4. The resulting oxidized polyamide active layer may have a relatively high atomic O/N ratio of 1.5:1, of 1.6:1, of 1.7:1, of 1.8:1, of 1.9:1, or in some cases as high as 1.99:1. In other exemplifications, the atomic O/N ratio of the resulting oxidized polyamide active layer can be at least any of the above ratios; or the resulting oxidized membrane can have an atomic O/N ratio in a range from any of the preceding ratios to another of the preceding ratios. The atomic O/N ratios referenced herein and in the claims are as-measured by x-ray photoelectron spectroscopy. If the active layer is coated with another layer, the atomic O/N ratio may be higher than the above ratios for uncoated active layers.

Figure 1:
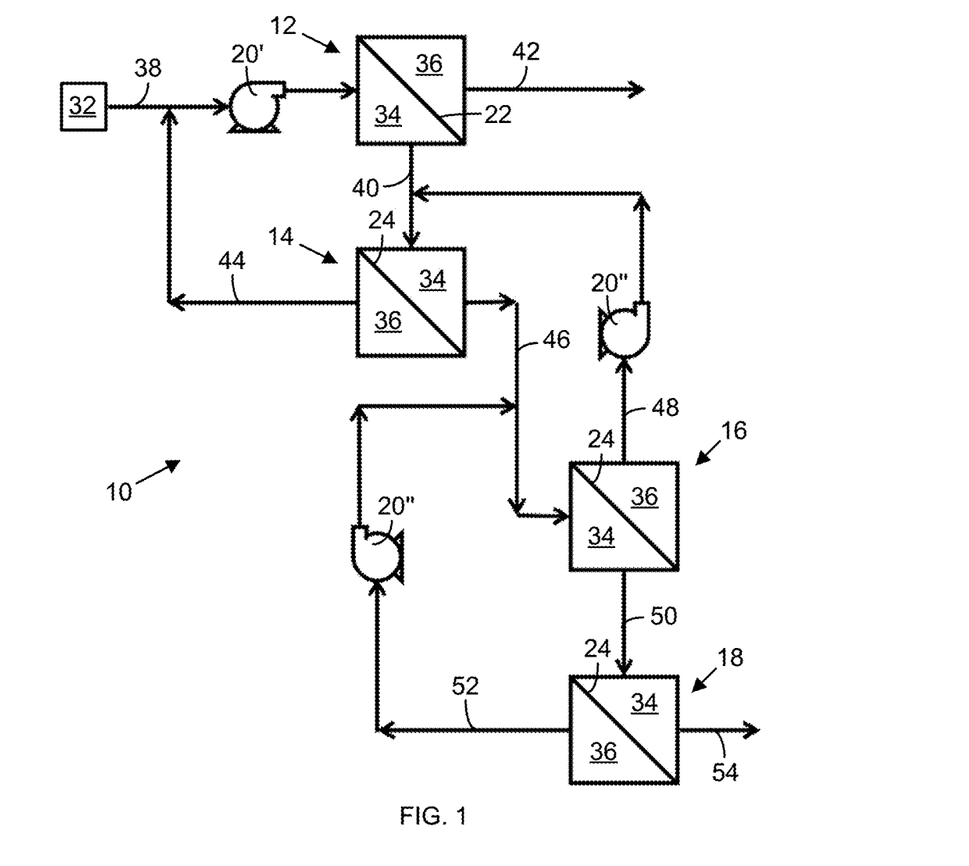
FIG. 1 is a schematic illustration of a multi-stage desalination system employing oxidized membranes.
Figure 4:
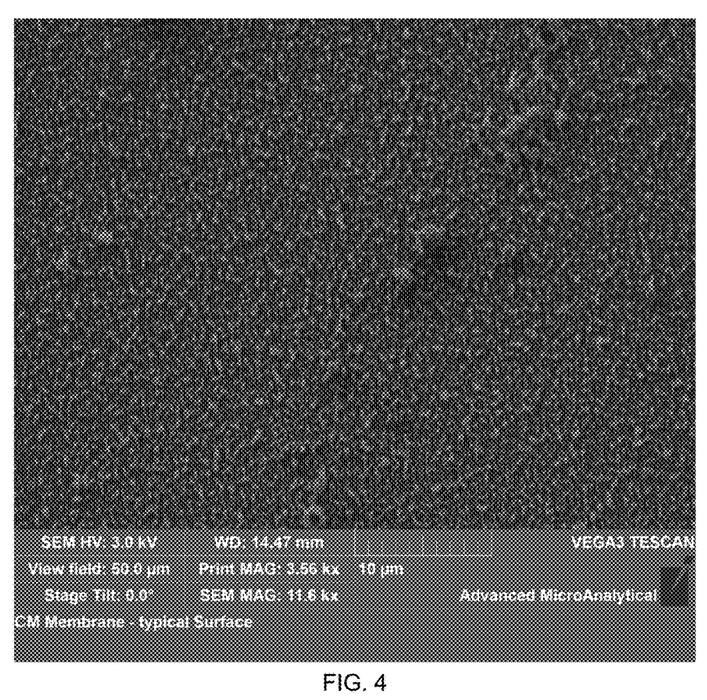
FIGS. 4 and 5 are SEM images of the surface of the oxidized active layer on a membrane.
Figure 5:
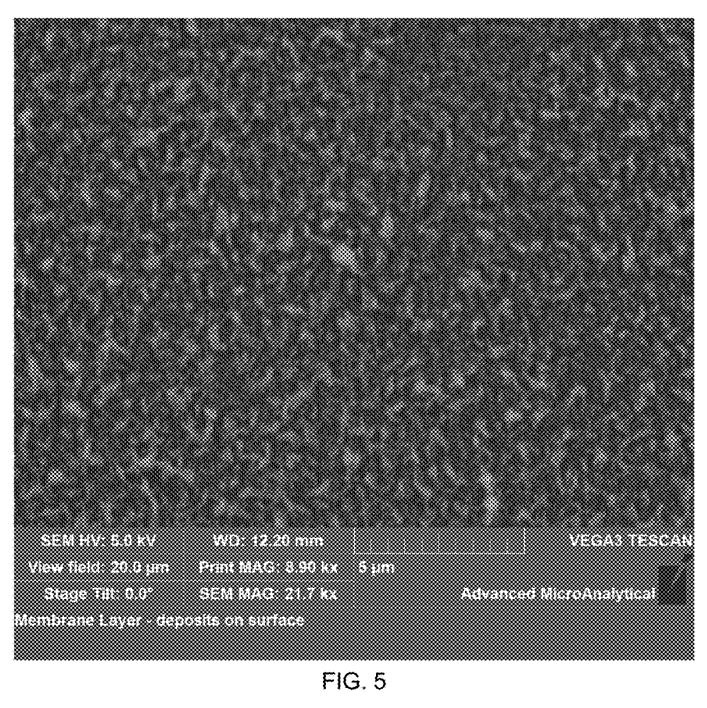

When the oxidant that is used to create these pores is chlorine-based, for example, sodium hypochlorite, the level of oxidation can be quantified by measuring the chlorine loading of the active layer. Without wishing to be bound to a particular theory, it is believed that the chlorine-based oxidant (e.g., sodium hypochlorite) interacts with aromatic polyamide to induce hydrolysis of C—N bonds to reduce the degree of cross linking and to cause incorporation of chlorine into the membrane matrix. This latter effect, the incorporation of chlorine into the membrane matrix, can be quantified as chlorine loading, defined as the percentage of chlorine content in the oxidized active layer 26. Chlorine loading is typically measured by X-ray Photoelectron Spectroscopy (XPS), for example, by using a Kratos AXIS Ultra XPS spectrometer at 1 eV resolution. The oxidation process is carefully controlled to result in suitable permeabilities. For a membrane with a 100-200-nm-thick active layer, an oxidant concentration-time of 5,000 to 50,000 parts per million (ppm)×hours (h) results in a membrane with a water permeability of 1 to 3 (liter/$m^2$/hour)/bar (LMH/bar). These permeability properties of the resulting membrane are between those typical of commercial reverse-osmosis membranes and nanofiltration membranes. Divalent-ion permeability is similar to monovalent-ion permeability, such that the composition of the permeate is similar to the composition of the influent and retentate streams. This property is contrasted with typical nanofiltration membranes in which monovalent-ion permeabilities tend to be significantly greater than divalent-ion permeabilities. Exemplary flow rates and salinities for the system shown in FIG. 1 are detailed in the Exemplification section, below. SEM images of the outer surfaces of oxidized polyamide active layers of a membrane are provided in FIGS. 4 and 5.

As shown in FIG. 1, the system 10 comprises a preliminary-stage, reverse-osmosis (RO) module 12, and at least one high-permeability, reverse-osmosis (HiRO) stage comprising at least one HiRO module 14/16/18. The exemplary system shown in FIG. 1 comprises three HiRO modules (i.e., a first-stage, high-permeability module 14; a second-stage, high-permeability module 16; and a third-stage, high-permeability module 18). The system further comprises high-pressure pumps 20, including an influent pump 20' and a HiRO permeate pump 20" for each HiRO stage (e.g., the HiRO stages respectively containing HiRO modules 16 and 18) after the first-stage HiRO (e.g., the HiRO stage containing HiRO module 14).

The preliminary reverse-osmosis stage comprises at least one reverse-osmosis membrane module 12. Where a plurality of RO membrane modules are utilized, the membrane modules can be arranged in parallel, in series, or in any combination of parallel or serial arrays. The reverse-osmosis membrane modules each comprise at least one RO membrane. The number of RO membranes 22 is dependent on design criteria, such as influent concentration and flow rate, and hydraulic pressure. The RO membrane modules may have a spiral wound configuration, a hollow fiber configuration, or any other configuration known in the art. In the exemplary system, the membrane area is 89 m$^2$ for a 7.7% salinity influent (feed liquid) flowing at 1.2 m$^3$/h, and a hydraulic pressure of 69 bar (6.9 MPa). Most commercial reverse-osmosis membranes (e.g., FILMTEC™ SW30XHR-440i membranes from The Dow Chemical Company, SWC5 MAX membranes from Hydranautics, and AD-440 membranes from SUEZ Water Technologies & Solutions) are suitable for this application.

Each high-permeability reverse-osmosis (HiRO) stage comprises at least one HiRO membrane module 14/16/18 arranged in parallel, series, or some combination thereof. The HiRO membrane modules each comprise at least one oxidized membrane and may have a spiral wound configuration, a hollow fiber configuration, or any other configuration known in the art. The oxidized membrane 24 (further discussed, below) of the HiRO membrane module can advantageously have a salt-permeation rate of 15 to 85% for saline streams including 7 to 20% salinity, respectively. Salt permeates by diffusion, and the rate of diffusion depends on the magnitude of the salt concentration. Therefore, the salt-permeation rate of an oxidized membrane 24 is dependent on the salinity of the feed stream. For example, an oxidized membrane 24 can have a salt-permeation rate of 33% for a 9% salinity feed stream and a 85% salt-permeation rate for a 20% salinity feed stream at similar hydraulic conditions. Like salt-permeation rate, the water permeability of an oxidized membrane 24 is also dependent on salinity. However, the rate of water permeation also depends on how much the hydraulic pressure of the feed exceeds the osmotic pressure. An oxidized membrane 24 operated at a pressure of 69 bar (6.9 MPa) can advantageously have a water-permeation rate of 35 to 15 liters per square meter per hour for saline feed streams including 7 to 20% salinity, respectively.

The oxidized membranes 24 are typically flat sheets wrapped in a spiral around a permeate conducting center tube. As discussed, above, the oxidized membranes 24 are manufactured for this desalination process by oxidizing the active layer of reverse-osmosis membranes, which can either be the same type of membrane as used in the preliminary RO stage or a different type of reverse-osmosis membrane, to create pores through which water and salts can diffuse. The nature of these pores defines the permeability characteristics of the oxidized membrane 24. As discussed above, the pore-generating impact of the oxidation can be quantified with chlorine loading. The process for producing these membranes 24 is discussed in further detail in the section below.

The membrane area in the HiRO stages (e.g., HiRO stages containing HiRO modules 14, 16, and 18) and the number of high-permeability membrane modules within each stage both vary depending on the position of the stage. Where a plurality of high-permeability membrane modules are utilized, the membrane modules can be arranged in parallel, in series, or in any combination of parallel or serial arrays. In the exemplary system, further discussed, below, the first stage 14 has a membrane area of 104 m$^2$; the second stage 16 has an area of 104 m$^2$; and the final stage 18 has an area of 52 m$^2$.

The influent/feed pump 20' and HiRO permeate pumps 20" can be any type of high-pressure pump, such as a HYDRA-CELL D35 piston pump from Wanner Engineering, Inc., capable of producing pressures up to 83 bar (8.3 MPa). The pumps 20 can be multi-stage centrifugal pumps, piston pumps, lobe pumps, etc.

A source 32 of feed solution is fluidically connected to the feed pump 20'. Examples of suitable sources 32 include membrane-desalination brine streams, thermal desalination brine streams, saline groundwater, etc.

In an exemplification of the oxidation of the polyamide active layer of the reverse-osmosis membranes, membranes are placed in a vessel and exposed to a sodium-hypochlorite solution including 100 to 10,000 parts per million (ppm) of free chlorine and a pH of 4 to 11 at a temperature of 25 degrees Centigrade and ambient-pressure conditions. Oxidation of the membranes is allowed to proceed for 1 to 50 hours. It has been found that pH, free-chlorine concentration, and oxidation time determine the characteristics of the oxidized membrane, and at similar pH levels the free-chlorine concentration and time can be adjusted proportionally to achieve similar results.

After oxidation, the sodium-hypochlorite solution is drained from the vessel, and the membranes are rinsed with a mixture of sodium bisulfate and pure water to remove residual oxidant solution until the chlorine concentration in the rinsate reaches zero mg/l.

The concentration, pH and time of the oxidation step are optimized for high water permeability and high rejection of a targeted ion or set of ions. As mentioned previously, the permeability of ions through the membrane is highly dependent on the constituent ions in the feed stream. For seawater concentration and other desalination applications, the concentration-time is typically optimized for the rejection of sodium chloride. The membrane oxidation can also be optimized for the rejection of lithium for the purpose of concentrating brines including lithium oxide, which may be advantageous for lithium-salt-production processes.

Due to fouling or compaction, the water permeability of the oxidized membranes 24 described herein may reduce during operation. Water permeability can be restored to its original level by subjecting the oxidized membranes 24 to a second oxidation process. In this process, the fouled or compacted oxidized membranes 24 are immersed in a sodium-hypochlorite solution including 10 to 100 ppm of free chlorine at a pH value of 4 to 11 and under ambient conditions. After oxidation is complete, the oxidized membranes 24 are removed from the oxidant solution and rinsed with pure water to remove residual oxidant.

Due to standard cleaning procedures, membrane aging, chlorine attack or due to the process described, above, for restoring permeability, the ion rejection of the oxidized membranes may decrease (i.e., the ion permeability may increase). This permeability can be reduced by introducing a rejection-enhancement agent to the retentate side of the membrane. Suitable rejection-enhancement agents include polyvinyl methyl ether (PVME), polyvinyl pyrrolidone (PVP), polyvinyl alcohol (PVA) and/or tannic acid.

The membrane rejection-restoration process can be performed offline or online (during desalination). In the offline process, the oxidized membrane 24 can be initially treated with an optional cleaning process in which cleaning chemicals are circulated and recirculated on the retentate side 34 of the HiRO module across the retentate side of the oxidized membrane 24. In this optional step, a first solution comprising citric acid and having a pH of about 4 can be recirculated across the retentate side of the membrane for a period up to 1 hour at a pressure similar to the operating pressure. Once the low-pH solution is discharged, a high-pH solution comprising sodium tripolyphosphate and ethylenediaminetetraacetic acid (EDTA) having a pH of about 10 can be recirculated across the retentate side of the oxidized membrane 24.

After the optional cleaning step, a coating step is performed comprising the introduction and recirculation of a solution of rejection-enhancement agents across the retentate side of the oxidized membrane 24 for a period of 5-30 minutes. Pressures of at least 150 psi (1 MPa) are applied, via the pumps 20, to ensure penetration of the rejection-enhancement agent into the oxidized membrane 24. The temperature of the solution is maintained so as not to exceed the critical solution temperature (also called the cloud point). For polyvinyl pyrrolidone and polyvinyl alcohol, this limitation is usually beyond the operational limitations of the oxidized membrane 24 and, therefore, not of much concern; but, for polyvinyl methyl ether, the temperature limitation of about 34 to 37° C. is observed. After the coating step is complete, a solution of tannic acid (TA) can be introduced to and recirculated across the retentate side of the oxidized membrane 24 for a period of 5-30 minutes. TA, which forms a negatively charged colloid in aqueous solutions, can form hydrogen bonds with other rejection-enhancement agents already bonded to the membrane surface, increasing the stability of the coating. After the coating step is complete, the oxidized membrane 24 can immediately be brought back into service.

The coating procedure can also be performed online during desalination service. In this process, a solution of concentrated rejection-enhancement agents is introduced to the feed stream for a period of 5-30 minutes. Following this coating step, a concentrated solution of TA can be introduced for a period of 5-30 minutes to increase the stability of the coating.

Exemplification

Using the system of FIG. 1, a simulation was created, wherein a feed liquid is fed from source 32 via conduit 38 as input to at least one preliminary-stage, reverse-osmosis module 12 via a high-pressure pump 20', which pressurizes the feed liquid at 1,200 pounds per square inch (psi) (8.3 MPa) on the retentate side of the reverse-osmosis membranes 22 inside the reverse-osmosis module 12. In this exemplification, 17 reverse-osmosis membranes 22 are provided in a spiral configuration. The feed liquid has a salt content of 62 g/l for a salinity (mass of dissolved salt/mass of solution) of 6.0%, and the feed liquid is fed at a rate of 1.2 m³/hr. A concentrated brine is drained from the retentate side 34 of the reverse-osmosis module 12 via conduit 40, while purified water (0.0% salinity) is extracted at a flow rate of 0.9 m³/hr through conduit 42 from the permeate side 36 of the reverse-osmosis membrane 22 inside the preliminary-stage, reverse-osmosis module 12. The concentrated retentate brine from the retentate side 34 of the preliminary-stage, reverse-osmosis module 12 has a salt content of 97.5 g/l (and a 9.2% salinity) and flows at a rate of 1.7 m³/hr to a first-stage, high-permeability, reverse-osmosis module 14 that includes oxidized membranes 24. The permeate extracted via conduit 44 from the permeate side 36 of the first-stage, high-permeability, reverse-osmosis module 14 (downstream from the oxidized membranes 24 of the first-stage filtration module 14) has a salt content of 68 g/l (and a salinity of 6.5%). This permeate is injected into the flow of the feed liquid in conduit 38 at a flow rate of 1.4 m³/h and pumped back into the retentate side 34 of the preliminary-stage reverse-osmosis module 12 so that more water can pass through the reverse-osmosis membranes 22 and be removed with the rest of the permeate through conduit 42.

The operational parameters in the six-membrane, first-stage, high-permeability RO module 14 are provided in Tables 1 and 2, below.

TABLE 1

(retentate brine):

| membrane number | pressure (MPa) | flow (m³/hr) | salinity (%) | rejection |
|---|---|---|---|---|
| 1 | 8.20 | 2.9 | 9.48 | 36% |
| 2 | 8.14 | 2.7 | 9.77 | 35% |
| 3 | 8.07 | 2.5 | 10.08 | 34% |
| 4 | 8.00 | 2.2 | 10.41 | 33% |
| 5 | 7.93 | 2.0 | 10-77 | 32% |
| 6 | 7.86 | 1.8 | 11.15 | 30% |

TABLE 2

(permeate):

| membrane number | flow (m³/hr) | flow (kg/s) | salinity (%) | flux (liter/m²/h) |
|---|---|---|---|---|
| 1 | 0.2 | 0.07 | 5.7 | 33 |
| 2 | 0.2 | 0.07 | 6.0 | 32 |
| 3 | 0.2 | 0.07 | 6.3 | 31 |
| 4 | 0.2 | 0.06 | 6.7 | 30 |
| 5 | 0.2 | 0.06 | 7.0 | 29 |
| 6 | 0.2 | 0.06 | 7.4 | 28 |

A further-concentrated retentate brine (with a salinity of 11.2% and a salt concentration of 120 g/l) is extracted via conduit 46 from the retentate side 34 of the first-stage, high-permeability, RO module 14 upstream from the oxidized membranes 24 of the first-stage, high-permeability, RO module 14 and injected into the retentate side 34 of a second-stage, high-permeability, RO module 16. A permeate with a salinity of 9.2% (with a salt concentration of 98 g/l) that has passed through the oxidized membranes 24 of the second-stage, high-permeability, RO module 16 is recirculated at a flow rate of 1.5 m³/h via a high-pressured pump 20" through conduit 48 and reinjected via conduit 40 together with the concentrated brine from the retentate side 34 of the preliminary-stage reverse-osmosis module 12 into the retentate side 34 of the first-stage high-permeability, RO module 14 to pass more water through the oxidized membranes 24 into the permeate side 36 of the first-stage, high-permeability, RO module 14 and then back to the preliminary-stage reverse-osmosis module 12. Meanwhile, a still-further-concentrated retentate brine with a salinity of 13.9% (with a salt concentration of 150 g/l) is extracted from the retentate side 34 of the second-stage, high-permeability, RO module 16 through conduit 50 and injected at a flow rate of 1.5 m³/hr into a retentate side 34 of a third-stage, high-permeability, RO module 18.

The operational parameters in the eight-membrane second-stage, high-permeability, RO module 16 are provided in Tables 3 and 4, below.

TABLE 3

(retentate brine):

| membrane number | pressure (MPa) | flow (m3/hr) | salinity (%) | rejection |
|---|---|---|---|---|
| 1 | 7.79 | 2.8 | 11.90 | 28% |
| 2 | 7.72 | 2.6 | 12.13 | 27% |
| 3 | 7.65 | 2.4 | 12.38 | 26% |
| 4 | 7.58 | 2.2 | 12.64 | 26% |
| 5 | 7.52 | 2.1 | 12.92 | 25% |
| 6 | 7.45 | 1.9 | 13.22 | 24% |
| 7 | 7.38 | 1.7 | 13.53 | 23% |
| 8 | 7.31 | 1.5 | 13.87 | 22% |

TABLE 4

(permeate):

| membrane number | flow (m³/hr) | flow (kg/s) | salinity (%) | flux (liter/m²/h) |
|---|---|---|---|---|
| 1 | 0.2 | 0.06 | 8.1 | 26 |
| 2 | 0.2 | 0.06 | 8.6 | 26 |
| 3 | 0.2 | 0.06 | 8.8 | 25 |
| 4 | 0.2 | 0.05 | 9.1 | 25 |
| 5 | 0.2 | 0.05 | 9.4 | 24 |
| 6 | 0.2 | 0.05 | 9.7 | 24 |
| 7 | 0.2 | 0.05 | 10.0 | 23 |
| 8 | 0.2 | 0.05 | 10.4 | 23 |

In the third-stage, high-permeability, RO module 18, the still-further-concentrated retentate brine is separated once more by the oxidized membranes 24 therein into a permeate with a 12.4% salinity (with a salt concentration of 140 g/l) and a flow rate of 1.2 m³/hr. The permeate is extracted through conduit 52 and pumped via a high-pressure pump 20" back to the second-stage, high-permeability, RO module 16, where it is injected, together with the still-further concentrated retentate brine from the second-stage, high-permeability, RO module 14, into the retentate side 34 of the second-stage, high-permeability, RO module 16 to extract additional permeate through the oxidized membranes 24 into the permeate side 36. Meanwhile, a most-concentrated retentate brine with a salinity of 18.5% (with a salt concentration of 210 g/l) is extracted via conduit 54 from the retentate side 24 of the third-stage, high-permeability, RO module 18 at a flow rate of 0.4 m³/hr.

The operational parameters in the eight-membrane third-stage, high-permeability, RO module 18 are provided in Tables 5 and 6, below.

TABLE 5

(retentate brine):

| membrane number | pressure (MPa) | flow (m³/hr) | salinity (%) | rejection |
|---|---|---|---|---|
| 1 | 7.24 | 1.4 | 14.24 | 22% |
| 2 | 7.17 | 1.2 | 14.64 | 21% |
| 3 | 7.10 | 1.1 | 15.08 | 20% |
| 4 | 7.05 | 0.9 | 15.57 | 19% |
| 5 | 6.96 | 0.8 | 16.12 | 18% |
| 6 | 6.89 | 0.6 | 16.76 | 17% |
| 7 | 6.83 | 0.5 | 17.53 | 16% |
| 8 | 6.76 | 0.4 | 18.51 | 15% |

TABLE 6

(permeate):

| membrane number | flow (m³/hr) | flow (kg/s) | salinity (%) | flux (liter/m²/h) |
|---|---|---|---|---|
| 1 | 0.2 | 0.05 | 10.8 | 22 |
| 2 | 0.2 | 0.05 | 11.2 | 22 |
| 3 | 0.2 | 0.05 | 11.6 | 21 |
| 4 | 0.2 | 0.05 | 12.1 | 20 |
| 5 | 0.1 | 0.04 | 12.6 | 20 |
| 6 | 0.1 | 0.04 | 13.2 | 19 |
| 7 | 0.1 | 0.04 | 13.9 | 18 |
| 8 | 0.1 | 0.04 | 14.7 | 17 |

All flux and rejection data for this estimation from the simulation were based on a 1,000 psi (6.9 MPa) feed pressure. The membrane area for each stage was as follows: (a) preliminary-stage reverse-osmosis module 12: 126.31 m² (17 membranes), (b) first-stage, high-permeability, RO module 14: 44.58 m² (6 membranes), (c) second-stage, high-permeability, RO module 16: 59.44 m² (8 membranes), and (d) third-stage, high-permeability, RO module 18: 59.44 m² (8 membranes). This multi-stage operation produces a purified water recovery of 71% with a specific energy consumption of 18.1 kW/m³.

In describing embodiments, herein, specific terminology is used for the sake of clarity. For the purpose of description, specific terms are intended to at least include technical and functional equivalents that operate in a similar manner to accomplish a similar result. Additionally, in some instances where a particular embodiment includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Further still, where methods are recited and where steps/stages are recited in a particular order—with or without sequenced prefacing characters added for ease of reference—the steps/stages are not to be interpreted as being temporally limited to the order in which they are recited unless otherwise specified or implied by the terms and phrasing.

This invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention.

What is claimed is:

1. A serial filtration system for liquid purification, comprising:
   a preliminary-stage reverse-osmosis module, comprising:
   (a) a preliminary-stage chamber including a preliminary-stage inlet; a preliminary-stage retentate outlet; and a preliminary-stage permeate outlet; and
   (b) at least one preliminary-stage reverse-osmosis membrane mounted in the preliminary-stage chamber and separating the preliminary-stage chamber into a retentate side, including the preliminary-stage inlet and the preliminary-stage retentate outlet, on an upstream side of the at least one preliminary-stage reverse-osmosis membrane and a permeate side, including the preliminary-stage permeate outlet, on a downstream side of the at least one preliminary-stage reverse-osmosis membrane;
   a first-stage reverse-osmosis module, comprising:
   (a) a first-stage chamber including a first-stage inlet; a first-stage retentate outlet; and a first-stage permeate outlet; and
   (b) at least one first-stage oxidized membrane, comprising an oxidized polyamide active layer coated on a porous support, wherein the oxidized polyamide active layer has an atomic oxygen/nitrogen ratio of at least 1.5:1 formed by exposing a polyamide active layer to a sodium-hypochlorite solution at a concentration-time in a range from 5,000 to 50,000 parts per million×hours, to produce the oxidized polyamide active layer and wherein the at least one first-stage oxidized membrane is mounted in the first-stage chamber and separates the first-stage chamber into a retentate side, including the first-stage inlet and the first-stage retentate outlet, on an upstream side of the at least one first-stage oxidized membrane and a permeate side, including the first-stage permeate outlet, on a downstream side of the at least one first-stage oxidized membrane; and
   a first-stage-inlet passage providing fluid communication between the preliminary-stage retentate outlet and the first-stage inlet and configured to direct retentate from the retentate side of the preliminary-stage chamber through the at least one first-stage oxidized membrane in the first-stage chamber.

2. The serial filtration system of claim 1, further comprising a first-stage-permeate-outlet passage configured to provide first-stage permeate flow from the first-stage permeate outlet into the preliminary-stage inlet on the retentate side of the preliminary-stage chamber.

3. The serial filtration system of claim 2, further comprising:
   a second-stage reverse-osmosis module, comprising:
   (a) a second-stage chamber including a second-stage inlet, a second-stage retentate outlet, and a second-stage permeate outlet, wherein the second-stage inlet is in fluid communication with the first-stage retentate outlet;
   (b) at least one second-stage oxidized membrane, comprising an oxidized polyamide active layer coated on a porous support, wherein the oxidized polyamide active layer has an atomic oxygen/nitrogen ratio of at least 1.5:1 and is formed by exposing a polyamide active layer to a sodium-hypochlorite solution at a concentration-time in a range from 5,000 to 50,000 parts per million×hours, to produce the oxidized polyamide active layer and wherein the at least one second-stage oxidized membrane is mounted in the second-stage chamber and separates the second-stage chamber into a retentate side, including the second-stage inlet and the second-stage retentate outlet, on an upstream side of the at least one second-stage oxidized membrane and a permeate side, including the second-stage permeate outlet, on a downstream side of the at least one second-stage oxidized membrane; and
   a second-stage-inlet passage providing fluid communication between the first-stage retentate outlet and the second-stage inlet and configured to direct retentate from the retentate side of the first-stage chamber through the at least one second-stage oxidized membrane in the second-stage chamber.

4. The serial filtration system of claim 3, further comprising:
   a preliminary-stage pump positioned upstream from the preliminary-stage inlet and configured to pump and pressurize feed liquid fed through the preliminary-stage inlet to pass solvent in the feed liquid from the retentate side of the preliminary-stage chamber through the at least one preliminary-stage reverse-osmosis membrane into the permeate side of the preliminary-stage chamber; and
   a second-stage pump positioned downstream from the second-stage permeate outlet and configured to pump and pressurize second-stage permeate liquid from the permeate side of the second-stage chamber into the retentate side of the first-stage chamber and to pass solvent from the second-stage permeate liquid through the at least one first-stage oxidized membrane into the permeate side of the first-stage chamber.

5. The serial filtration system of claim 3, wherein the surface area of the at least one first-stage oxidized membrane that differs from a surface area of the at least one second-stage oxidized membrane.

6. The serial filtration system of claim 1, wherein the porous support of the at least one first-stage oxidized membrane comprises a porous layer comprising at least one of polyethersulfone and polysulfone on a non-woven fabric support sheet.

7. A method for serial filtration, comprising:
   utilizing the serial filtration system, as described in claim 1;
   feeding a feed liquid comprising a solvent and dissolved ions through the preliminary-stage inlet into the preliminary-stage chamber and establishing a pressure on the retentate side of the at least one preliminary-stage reverse-osmosis module that is greater than a pressure on the permeate side of the preliminary-stage chamber;
   selectively passing a solvent in a preliminary-stage permeate from the retentate side of the preliminary-stage chamber through the at least one preliminary-stage reverse-osmosis membrane into the permeate side of the preliminary-stage chamber while retaining a preliminary-stage retentate brine with an increased concentration of the dissolved ions on the retentate side of the preliminary-stage chamber;
   removing the preliminary-stage retentate brine through the preliminary-stage retentate outlet and then directing the preliminary-stage retentate brine through the first-stage inlet into the first-stage chamber and establishing a pressure in the retentate side of the first-stage chamber that is greater than a pressure in the permeate side of the first-stage chamber; and selectively passing a solvent in a first-stage permeate from the retentate side of the first-stage chamber through the at least one first-stage oxidized membrane into the permeate side of the first-stage chamber while retaining a first-stage retentate brine with a further-increased concentration of the dissolved ions on the retentate side of the first-stage chamber.

8. The method of claim 7, further comprising directing the first-stage permeate through the first-stage permeate outlet and back through the preliminary-stage inlet of the retentate side of the preliminary-stage chamber along with the feed liquid.

9. The method of claim 7, further comprising removing the first-stage retentate brine from the retentate side of the first-stage chamber through the first-stage retentate outlet and then directing the first-stage retentate brine though a second-stage inlet into a second-stage chamber of a second-stage reverse-osmosis module that further includes at least one second-stage oxidized membrane that separates the second-stage chamber into a retentate side and a permeate side and establishing a pressure in the retentate side of the second-stage chamber that is greater than a pressure in the permeate side of the second-stage chamber.

10. The method of claim 7, wherein the oxidized polyamide active layer of the at least one first-stage oxidized membrane is a partially oxidized polyamide layer, and wherein the partially oxidized polyamide layer is formed by exposing the polyamide active layer to an oxidant that is the sodium-hypochlorite solution to create controlled porosity in the polyamide layer, the method further comprising:

after extended practice of the method of claim 7, subjecting the at least one first-stage oxidized membrane to an oxidation adjustment step, comprising exposing the at least one first-stage oxidized membrane to the oxidant to adjust the controlled porosity in the partially oxidized polyamide layer; and resuming practice of the method of claim 7 after performing the oxidation adjustment step.

11. The method of claim 7, further comprising introducing an ion-rejection-enhancement agent to the retentate side of the at least one first-stage oxidized membrane, wherein the ion-rejection-enhancement agent reduces a permeability of the at least one first-stage oxidized membrane.

12. The method of claim 11, wherein the ion-rejection-enhancement agent comprises at least one composition selected from polyvinyl methyl ether, polyvinyl pyrrolidone, polyvinyl alcohol, and tannic acid.

13. A method for fabricating an oxidized membrane for reverse osmosis, comprising:

providing a reverse-osmosis membrane comprising a polyamide active layer coated on a porous support; and exposing the polyamide active layer to a sodium-hypochlorite solution to create an oxidized polyamide active layer having an atomic oxygen/nitrogen ratio of at least 1.5:1, wherein the polyamide active layer is exposed to the sodium-hypochlorite solution at a concentration-time in a range from 5,000 to 50,000 parts per million× hours.

14. The serial filtration system of claim 3, further comprising a second-stage-permeate-outlet passage configured to provide second-stage permeate flow from the second-stage permeate outlet into the first-stage inlet on the retentate side of the first-stage chamber.

15. The method of claim 13, wherein the porous support of the reverse-osmosis membrane comprises a porous layer comprising at least one of polyethersulfone and polysulfone on a non-woven fabric support sheet.

16. The method of claim 13, further comprising an ion-rejection-enhancement agent applied to the reverse-osmosis membrane, wherein the ion-rejection-enhancement agent reduces a permeability of the reverse-osmosis membrane.

17. The method of claim 16, wherein the ion-rejection-enhancement agent comprises at least one composition selected from polyvinyl methyl ether, polyvinyl pyrrolidone, polyvinyl alcohol, and tannic acid.

* * * * *